United States Patent [19]
Jenkins

[11] Patent Number: 5,469,992
[45] Date of Patent: Nov. 28, 1995

[54] MULTI-COMPARTMENTED DEVICE FOR DISPENSING EXACT QUANTITIES OF DRY MATERIAL

[76] Inventor: Johnny L. Jenkins, 3767 Hardee Dr., Kennesaw, Ga. 30144

[21] Appl. No.: 176,533

[22] Filed: Jan. 3, 1994

[51] Int. Cl.[6] .................................................. G01F 11/10
[52] U.S. Cl. .................... 222/362; 222/242; 222/185.1
[58] Field of Search .................................. 222/181, 354, 222/185, 370, 361, 362, 43, 284, 242

[56] References Cited

U.S. PATENT DOCUMENTS

| | | | |
|---|---|---|---|
| 1,238,182 | 8/1917 | Nichols et al. | 222/362 |
| 2,002,039 | 5/1935 | McPhee | 222/362 X |
| 2,032,763 | 3/1936 | Mostkoff | 222/362 X |
| 2,399,016 | 4/1946 | Gits | 222/362 X |
| 2,446,582 | 8/1948 | Gopner | 222/362 X |
| 2,584,781 | 2/1952 | Beatty | 222/362 |
| 2,775,270 | 12/1956 | McKillop | 222/362 X |
| 3,294,284 | 12/1966 | Chambers . | |
| 3,311,273 | 3/1967 | Cayer | 222/362 |
| 3,593,882 | 7/1971 | Rhindress . | |
| 4,032,050 | 6/1977 | Funk | 222/362 X |
| 4,083,452 | 4/1978 | Rossmo . | |
| 4,708,265 | 11/1987 | Bopst et al. | 222/362 X |
| 4,997,405 | 3/1991 | Dabrowski . | |
| 5,014,877 | 5/1991 | Roos . | |
| 5,086,945 | 2/1992 | Corella . | |

FOREIGN PATENT DOCUMENTS

| | | |
|---|---|---|
| 1101989 | 10/1955 | France . |
| 1392120 | 4/1965 | France . |
| 2049202 | 4/1972 | Germany . |
| 1432742 | 4/1976 | United Kingdom . |

*Primary Examiner*—Andres Kashnikow
*Assistant Examiner*—Kenneth R. DeRosa
*Attorney, Agent, or Firm*—Julian C. Renfro

[57] ABSTRACT

A device for dispensing an exact, selected quantity of loose dry material, with this device comprising a multi-compartmented member rotatable about a substantially vertically-disposed axis toward and away from a reference location. The compartments of this member are of a specific, uniform configuration and spaced symmetrically about the substantially vertical axis. The multi-compartmented member is disposed between upper and lower generally planar partitions, with an aperture of approximately the same configuration as the compartments of the rotatable member located in each of the partitions. Importantly, one aperture is located in an offset relationship with respect to the other. Dry material to be dispensed is located above the upper partition, with such dry material dropping under the influence of gravity through its aperture into one or more of the compartments of the member as this member is rotated about its axis away from the reference location. As a result of this, one or more of the compartments of the member become filled with dry material, with the number of compartments filled being determined by the extent of rotation of the member away from the reference location. The material in the compartments thereafter drops downward through the aperture in the lower partition during rotation of the member back to the reference location. This novel measuring and dispensing device can be utilized as an integral part of a canister in which dry material is stored.

19 Claims, 3 Drawing Sheets

5,469,992

MULTI-COMPARTMENTED DEVICE FOR DISPENSING EXACT QUANTITIES OF DRY MATERIAL

BACKGROUND OF THE INVENTION

For many generations now, cooks, chefs and housewives have utilized canisters of various sizes in order that desired amounts of sugar, flour, certain grains and the like can be safely stored in a kitchen, effectively isolated from ants or any other invading insects. When ingredients for bread, cake or other baked goods are to be measured out, it is typical to use a measuring cup, so that the proper amount of ingredients can be placed into a container such as a mixing bowl, in order that a suitable amount of mixing and stirring can be brought about.

As is obvious, this type of procedure can be time consuming as well as inexact, for the cook, chef or housewife must uncap each canister, insert a measuring cup in the canister, and then dump the contents into a mixing bowl or the like. Depending on the nature of the ingredients being dealt with, it may or may not be necessary to utilize more than one measuring cup for dispensing the several different ingredients that may be involved in a given instance.

It is a primary purpose of this invention to obviate such a clumsy procedure.

SUMMARY OF THE INVENTION

In accordance with this invention, I utilize a novel device for receiving loose quantities of dry material, and thereafter dispensing a selected quantity of such dry material in a quick and sterile manner. My novel device utilizes a multi-compartmented member disposed in a generally cylindrical housing, which member is rotatable to a selected extent about a central, generally vertical axis. Each compartment of the member is principally made up of substantially vertically disposed sidewalls arrayed in a consistent, uniform configuration, with each such compartment or measuring segment being symmetrically disposed about the central axis.

A first generally planar partition is located above the rotatable, multi-compartmented member, whereas a second generally planar partition is located below the multi-compartmented member, with an aperture of suitable size being disposed in each partition. Importantly, the entrance aperture located in the upper partition is offset from the dispensing aperture located in the lower partition, for a distance corresponding approximately to the width of a full-size compartment of the rotatable member, thereby preventing the existence of any position of the multi-compartmented member in which a through path for the dry material would be formed.

I provide an operating lever enabling the user to turn the multi-compartmented member for a suitable extent in a first direction, permitting certain compartments or measuring segments of the member to be filled, with this being followed by the user moving the lever back to a reference location, during which time the filled compartments are then permitted to empty through the lower or dispensing aperture into a suitable container placed below the dispensing aperture. Because I utilize compartments of the multi-compartmented member whose size has been standardized, which is a size corresponding to the size of the entrance aperture, it can be expected that precise gradations of the dispensed amounts can be readily selected.

In the embodiment of my invention described in the present instance, the measured amounts may be in fractions of a cup, such as ¼ cup, ⅓ cup, ½ cup, ¾ cup, 1 cup and the like. Quite obviously, I am not to be limited to such an arrangement as this, for dispensed amounts other than in fractions of a cup can be accomplished within the spirit and construction of this invention.

As a result of this arrangement, a chef, cook or housewife can apportion out precise quantities of dry materials in connection with the mixing of bread or cake dough or the like, with considerable speed and without involving the use of one or more measuring cups.

It is to be understood that my novel measuring and dispensing device can form an integral part of a canister or dispenser for flour, sugar, grains or the like, or my novel dispensing device can be constructed so as to be usable as a separate entity in a kitchen for measuring out selected quantities of a number of different dry ingredients.

It is therefore a principal object of my invention to provide a novel measuring and dispensing device of inexpensive yet highly effective construction for dispensing an exact, selected quantity of loose dry material in a rapid and sterile manner.

It is another object of my invention to provide a rotatable, multi-compartmented member utilized either as a separate entity for measuring selected quantities of dry material, or as an essential part of a canister in a lower portion of which, a pull-out drawer is utilized for receiving the measured quantity of dry material.

It is still another object of my invention to provide a rotatable, multi-compartmented member utilized in conjunction with an entrance aperture and a dispensing aperture disposed in a precise relationship, with the arrangement being such that one or more compartments or measuring segments of the rotatable member are filled when the member is rotated away from a reference location, with those compartments thereafter being emptied, such as into a receiving receptacle, at such time as the multi-compartmented member has been rotated back to the reference location.

It is yet another object of my invention to provide a rotatable, multi-compartmented member utilized in conjunction with an entrance aperture, and a dispensing aperture disposed in a precise, offset relationship to the entrance aperture, with this novel multi-compartmented member utilized as a separate entity suitable for measuring any of a number of different, selected dry ingredients into an appropriate receptacle.

It is yet still another object of my invention to provide a rotatable, multi-compartmented member utilized in conjunction with an entrance aperture and a dispensing aperture disposed in a precise, offset relationship, with my novel multi-compartmented member forming an essential part of a canister utilized for the storage of a selected dry ingredient, with the multi-compartmented member enabling a desired quantity of the particular dry ingredient to be measured into a receptacle forming a part of the canister.

These and other objects, features and advantages will be more apparent as the description proceeds.

DETAILED DESCRIPTION

Figure 1:
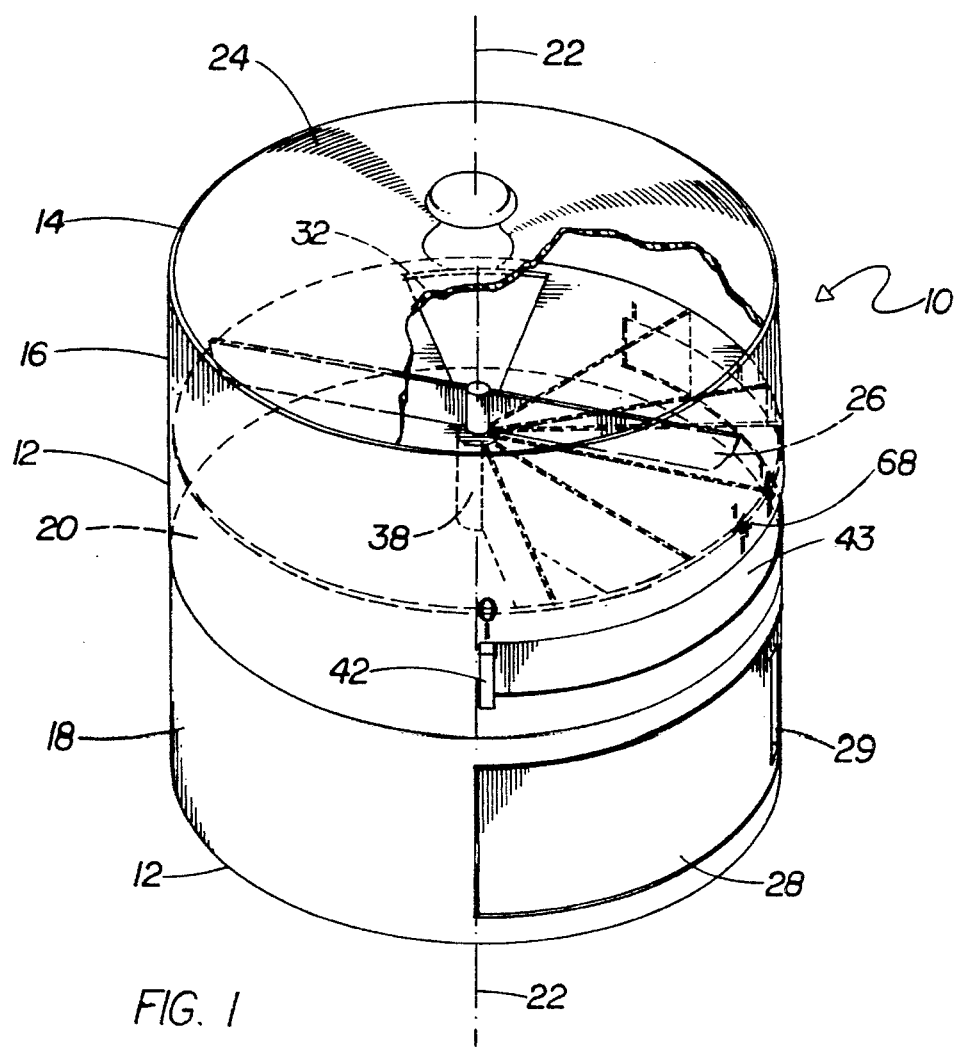
FIG. 1 is a perspective view of a preferred embodiment of my novel measuring device, in this instance being utilized as part of a canister, with certain portions broken away to reveal internal construction, and with phantom lines utilized to depict significant portions of this device.

With initial reference to FIG. 1, it is to be seen that in accordance with a primary embodiment of my invention, I have provided a multi-compartmented measuring and dispensing device 10 of generally cylindrical shape. This device comprises a housing member 12, which may be made of transparent plastic or other suitable material. In the preferred embodiment, the housing member 12 may be regarded as a canister, with the sidewall 14 of the housing member or canister being of cylindrical configuration and of considerable height. It is to be understood that an upper part or section 16 is separated from the lower part or section 18 by a multi-compartmented member 20. The member 20 is mounted in the mid portion of the housing member 12 so as to be rotatable in either direction about the vertical axis 22 called out in FIG. 1. The multi-compartmented, rotatably mounted member 20 is shown in clearer detail in FIG. 2.

The upper part or section 16 of the housing 10 is open to receive a loose, dry material such as flour, sugar or raisins, or a grain such as rice, oats or the like. Other options are also available, so I do not wish to be limited to the mentioned materials. A cap or closure member 24 fits tightly upon the upper edge of the sidewall 14 of the housing member 12, but the closure member 24 can be easily removed in order that an additional quantity of a selected dry ingredient can be added to the upper section 16 of the housing member 12.

Figure 3:
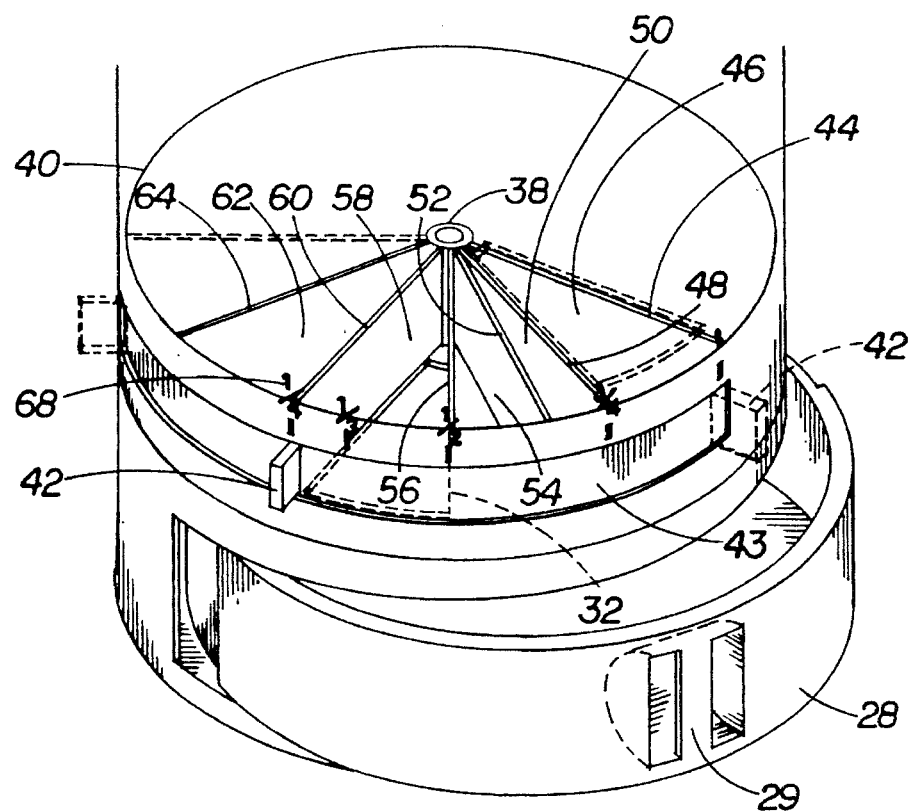
FIG. 3 is a view of the components utilized in the lower portion of the device depicted in FIG. 1, with this view revealing the operating lever having been moved from a dashed-line position to a full-line position in order to depict how the multi-compartmented member representing an essential portion of this invention can be moved by the operator in one direction and then in another direction during a measuring and dispensing operation.
Figure 5:
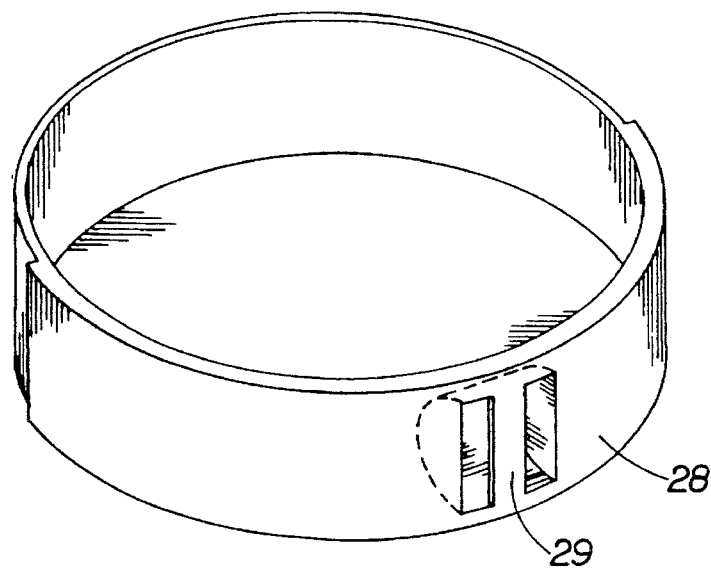
FIG. 5 is a view of the particular drawer I prefer to use.

In the preferred embodiment of my invention depicted in FIG. 1, the generally cylindrical sidewall 14 is of substantial height, such that the lower section 18 defined below the rotatably mounted member 20 can accommodate a slidably mounted drawer 28. The drawer 28 is best seen in FIGS. 3 and 5. As will be described in some detail hereinafter, this drawer is placed so as to catch the dry material dispensed from the upper part of the device.

Returning to FIG. 1, it is to be noted that the upper section 16 of my device is configured to receive a substantial quantity of dry material to be dispensed. From FIG. 2 it is possible to ascertain the size of the upper part or section 16. To keep the dry material from taking on moisture from the ambient air, the previously mentioned cap 24 is to be replaced snugly upon the sidewall 14 of the housing member 12 after the upper part or section 16 of my device has been filled to a desired extent.

Figure 2:
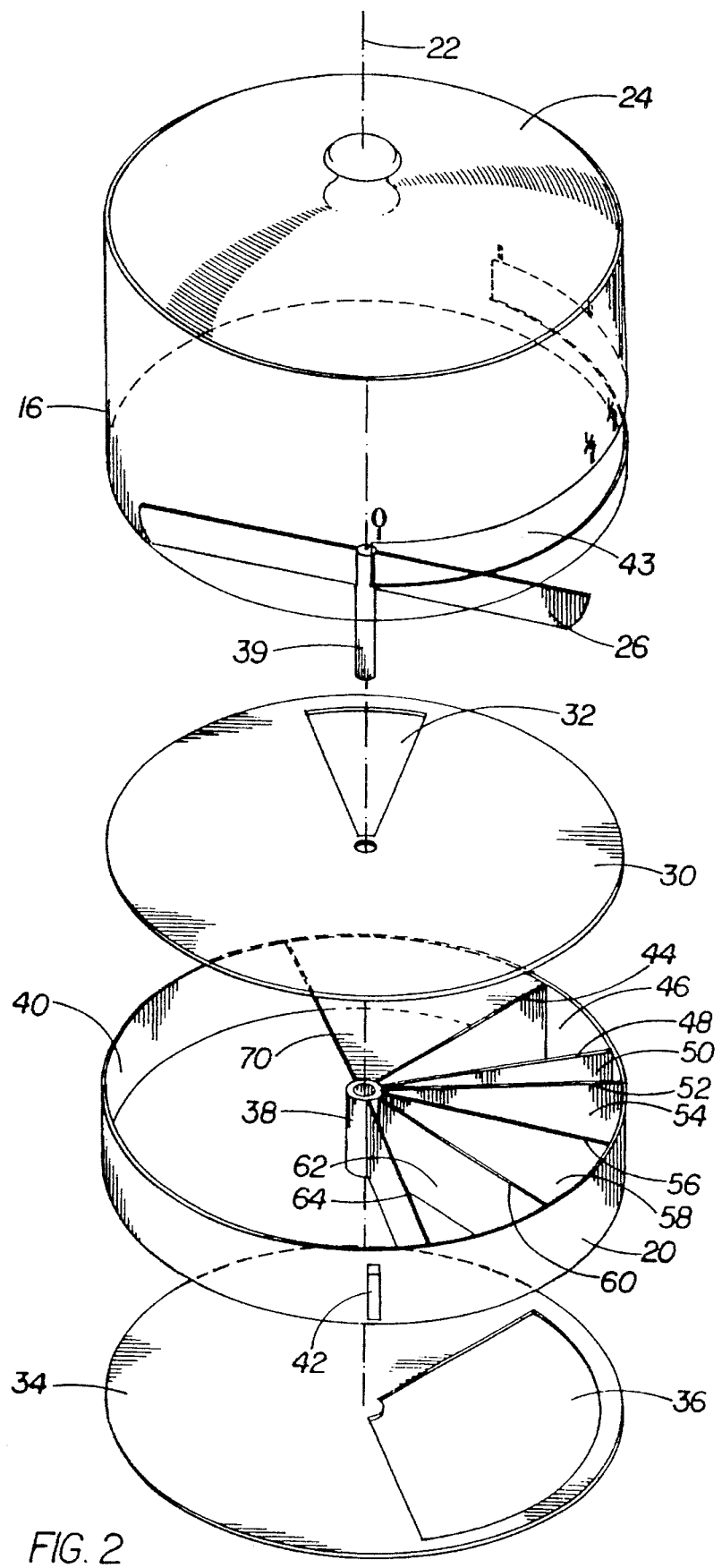
FIG. 2 is an exploded view revealing several of the components serving to provide a measuring and dispensing device, with these components being substantially identical to those shown in assembled relationship in the upper portion of FIG. 1.

It is to be noted from FIGS. 1 and 2 that a stirring member 26 may be rotatably mounted in the upper section 16 of the housing, to cause the dry material to move or flow in a desirable manner at the time that such material is to be dispensed from the device.

A key feature of my device involves the rotatable, multi-compartmented member 20, which is located directly below an upper or first planar partition 30, which partition may be regarded as defining the bottom part of the upper section 16 of my novel device. Dry material may be stored over a relatively long period of time in the upper section 16 of the device, with such dry material resting upon the upper or first partition 30.

Located in the first or upper partition 30 is an aperture 32, known as the entrance aperture. The multi-compartmented, rotatable member 20 is located directly below the upper partition 30, and it is located directly above a lower or second partition 34, upon which the member 20 rests. Both of these partitions are clearly visible in FIG. 2, with both partitions fitting closely against the rotatable member 20, without presenting any consequential drag or friction. It is to be seen from FIG. 2 that located in the second or lower partition 34 is an aperture 36, hereinafter referred to as the dispensing aperture. The aperture 36 is of considerable size, and is rotationally removed from alignment with the aperture 32, for a reason to be described shortly. Both the upper partition 30 and the lower partition 34 are disposed essentially in a horizontal plane, and neither is rotatable.

Also to be seen from FIG. 2 is the fact that multi-compartmented member 20 has a central hub 38, through which a central axis extends, and in which the mounting component 39 for the stirring member 26 may be installed. Additionally visible in FIG. 2 are a number of dividers or radially disposed, vertical walls serving to define several distinct compartments or measuring segments in the member 20. With but a single exception discussed hereinafter, each compartment or measuring segment is of a specific, uniform configuration. These compartments are surrounded by an encircling member or enclosure member 40, to which an operating lever 42 is firmly attached. It is into the compartments or measuring segments located in the member 20 that the dry material deposited in the upper section 16 of the housing member 12 can on occasion fall, via the aperture 32 located in the first or upper partition 30. No closure member is attached to the bottom of the rotatable, multi-compartmented member 20, or in other words, the compartments defined in the member 20 by the walls or dividers have sides, but no tops and no bottoms. All of the walls or dividers are of the same uniform height.

The lower or second planar partition 34 forms the lower closure for the several compartments defined in the rotatable member 20, upon which partition the dry material rests until such time as the member 20 is rotated so as to cause one or more of the compartments or measuring segments to come into registry with the dispensing or lower aperture 36, located in the second partition 34.

Continuing with FIG. 2, it is to be seen that a first divider or wall 44 and a second divider or wall 48 extend between the central hub 38 of the member 20, and the encircling member 40, thus to define a first compartment 46, into which dry material from the upper section 16 of the housing member 12 can on occasion fall, via the upper aperture 32. These walls or dividers as well as the other walls or dividers of the multi-compartmented device 12 are generally vertically disposed. This construction is also visible in FIG. 3.

Although my novel rotatable member 20 may be configured so as to represent other units of measure, I prefer for the several compartments to each receive one-fourth cup of dry measure. Therefore, to measure out one-half cup, two compartments are to be filled; to measure out three-fourths cup, three compartments are to be filled; and so forth.

With regard to the above-mentioned single exception to the otherwise uniform arrangement of compartments or measuring segments, it is to be noted that I may optionally place a third divider or wall 52 so that one-third cup can be measured. This third divider or wall 52 is placed relatively close to the second wall 48, so as to define a second compartment 50 that is noticeably smaller than the other compartments of the rotatable member 20. Whereas an adjacent pair of radially disposed walls in other instances are separated a distance such as to represent one-fourth cup of dry measure, in the instance involving the second and third walls, the distance these walls are apart is such as to receive only one-twelfth cup. As a result of this, when only the first compartment 46 is filled, this represents 3/12ths of a cup, whereas when the first and second compartments 46 and 50 are filled, this represents 4/12ths of a cup, which of course is the same as 1/3rd cup.

Continuing with the arrangement depicted in FIGS. 2 and 3, the fourth divider or wall 56 is spaced from the third divider or wall 52 the equivalent of 2/12ths (1/6th cup), such that a third compartment 54 is defined. Therefore, when the first three compartments, compartments 46, 50 and 54 have been filled, ½ cup of dry material has been measured.

From this point on, the compartments or measuring segments are of uniform size, with the fifth divider or wall 60 being spaced from the fourth divider or wall 56 a sufficient distance as to define a full size, quarter-cup compartment 58. The compartment 58 is to be regarded as the fourth compartment. Lastly, the sixth wall or divider 64 is spaced from the fifth wall or divider 60 a sufficient distance as to define the last full size, quarter cup compartment 62, the compartment 62 being regarded as the fifth compartment.

It is now to be seen that except for the compartmentation associated with the measurement of one-third cup, these several compartments are of a specific, uniform configuration and spaced symmetrically about the substantially vertical axis 22.

With regard to FIG. 2, it is to be realized that a closure 70 is located on an upper portion of the multi-compartmented member 20, connected to the upper edge of the encircling member 40 as well as to the upper edge of the first wall 44. The closure 70 is utilized to prevent dry material pouring or falling out of the upper section 16 of the housing member 12 into a compartment of the multi-compartmented member 20 until such time as the operating lever 42 has been moved away from the zero dispense or reference location. With the exception of the smaller, non-uniform compartments 50 and 54, the volumes of the compartments 46, 58 and 62 defined by the several pairs of radially-extending walls or dividers are substantially identical, and these compartments may be described as generally triangular, with each containing one-fourth cup. As to the smaller compartments 50 and 54, these together define a one-fourth cup. Therefore, by filling all of the compartments depicted in FIGS. 2 and 3, a full cup of dry material can be measured.

As illustrated in FIG. 2, and as will be discussed hereinafter, the configuration of each full-sized compartment or measuring segment of the multi-compartmented member 20 closely coincides with the configuration of the entrance aperture 32 located in the upper or first partition 30.

Although as previously mentioned, I prefer for my novel measuring and dispensing device to be utilized as an essential part of a canister, as depicted in FIG. 1, it is also to be understood that the components depicted in FIG. 2, involving the multi-compartmented member utilized in a proper and operative relationship with an entrance aperture and a dispensing aperture, can be constructed into a functional entity and utilized separate from utilization as a canister. Such usage would typically be as a hand-held device suitable for measuring any of a number of different, selected dry ingredients into an appropriate receptacle.

Referring to FIGS. 1 and 3, it is to be seen that the operating lever 42 is operatively mounted in a slot 43 located in the sidewall 14 of the housing member 12. As to be seen from FIG. 3, appropriate markings 68, involving for example ¼ cup, ⅓ cup, ½ cup, etc., are provided at appropriate, spaced locations along the length of the slot 43, so that the user can ascertain the amount of material permitted in a given instance to drop from the upper section 16 of the housing member, into one or more of the compartments of the rotatable member 20, via the entrance aperture 32. The entrance aperture is of course best seen in FIG. 2. When the member 20 is moved by the lever 42 back to the zero position, the precisely measured sugar, flour, oats, etc. is dispensed through the dispensing aperture 36 into the drawer 28 that is preferably employed in conjunction with canister use, or if not used in conjunction with a canister, the dry material is dispensed into a cup or bowl placed beneath the aperture 36.

It has already been mentioned that when the operating lever 42 has been moved to the end of the slot 43 representing the zero dispense or reference location, the closure portion 70 of the multi-compartmented member 20 prevents any dry material from pouring out of the upper section 16 of the housing member 12, through the entrance aperture 32 and thence onto the lower partition 34.

Figure 4:
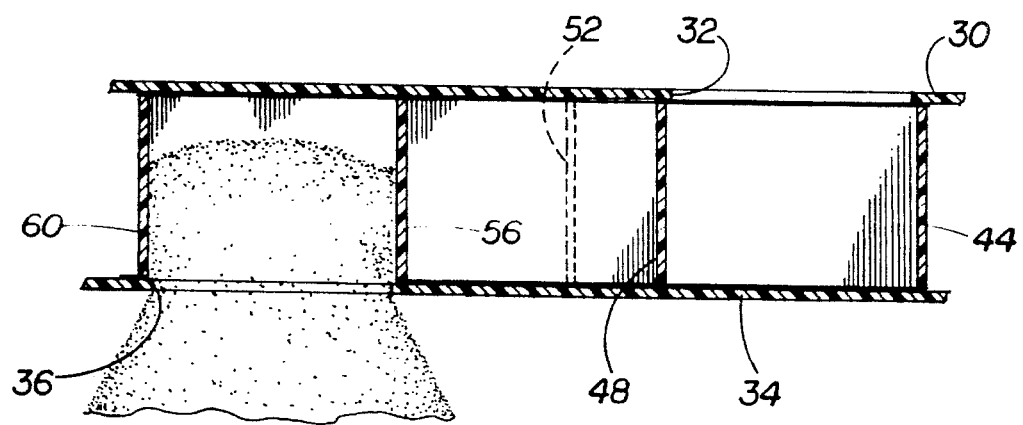
FIG. 4 is a fragmentary view to a substantially larger scale, revealing the relationship between certain sidewalls of the rotatable member, and the entrance and dispensing apertures utilized with the rotatable member, with these apertures residing in a carefully positioned, offset relationship.

With reference now to FIG. 4, it is to be observed that I have shown in full lines, the first wall 44, the second wall 48, the wall 56 and the wall 60, which walls or partitions are involved in a regular, consistently spaced relationship, with the volume between each adjacent pair of walls being the same as the volume between any other adjacent pair of walls. In the instance depicted in FIG. 4, I have shown the wall 52 in dashed lines, inasmuch as its use is optional, and it alone is of a spacing different than the spacings of the above-mentioned walls. All of these walls are of the same, consistent height.

In FIG. 4, certain walls of the compartmented member 20 are in an operative relationship to the upper or first partition 30, and the lower or second partition 34. It is to be noted that in this instance, I have indicated the entrance aperture 32 to be located between the first wall 44 and the second wall 48, whereas the dispensing aperture 36 is disposed between the walls 56 and 60.

From FIG. 4 I have made clear that the entrance aperture 32 and the dispensing aperture 36 are deliberately placed in an offset relationship. As a matter of fact, the space or interval between the entrance aperture 32 and the dispensing aperture 36 should be the width of at least one of the consistently-spaced measuring segments in order to prevent dry material from falling from the upper section 16, entirely through the rotatable member 20 and into the lower part or section 18 as the operating lever 42 is rotated. It is thus to be seen that irrespective of the particular positioning of the operating lever 42 to bring about the dispensing of a certain amount of the dry material, there will be no "through path" that would permit an uncontrolled amount of dry material flowing from the entrance or upper aperture 32 straight through the member 20 and out through the dispensing aperture 36.

In the particular instance depicted in FIG. 4, the operating lever 42 has been moved away from the reference or zero dispensing position, and in this instance, the dispensing of ¼ cup of dry material contained between walls or partitions 60 and 56 is being brought about. It is to be recalled, however, that I am not to be limited to the dispensing of dry materials with regard to fractions of a cup, for other units of dry measure could be used instead. As one example, each measuring segment could involve a certain fraction of a liter.

As to the operation of my device, I have created a dispensing device involving a housing member 12 having an upper section 16 into which dry material to be dispensed in selected increments is placed. The dry material rests upon the upper or first partition 30, in which the entrance aperture 32 is positioned. As previously mentioned, the rotatable, multi-compartmented member 20 is in a particular relationship with the entrance aperture 32, such that closure 70, located in contact with the first wall 44, effectively prevents any dry material pouring through the aperture 32 when the operating lever 42 is in the reference location or zero dispense position. However, when the operating lever 42 has been moved away from the reference location to the "¼ cup" position, the first wall 44 rests on one side of the entrance aperture 32, and the second wall 48 rests on the other side of the entrance aperture 32, such that the first compartment or segment 46 can be filled with dry material. When the user subsequently moves the operating lever 42 back to the reference location, this causes the first compartment 46 to move into registry with the dispensing aperture 36 located in the lower or second partition 34. As a consequence, ¼ cup of dry material can readily pour from the first compartment into a receptacle, preferably the drawer 28, placed below the dispensing aperture 36. The stirring device 26 is preferably arranged to move in concert with the rotational movements of the multi-compartmented member 20.

Should the user move the operating lever 42 to the ⅓ cup position on the slot 43, this causes both the first compartment 46 as well as the small second compartment 50 to pass below the entrance aperture 32. Upon the operating lever being returned to the reference location, this causes ⅓ cup of dry material to pass from the first and second compartments through the dispensing aperture 36 and into the receptacle placed below the aperture 36.

Should the user decide to move the operating lever 42 to the ½ cup position on the slot 43, this causes the first compartment 46 as well as the second and third compartments 50 and 54 to pass below the entrance aperture 32. Because the dry material placed in the upper section 16 of the housing member 12 can usually pour easily, the dry material flows via the entrance aperture 32 and fills the first compartment 46 as well as the second and third compartments 50 and 54 of the multi-compartmented member 12. If at this point the user moves the operating lever 42 back to the reference location, the first compartment as well as the second and third compartments move across the dispensing aperture 36, thus permitting ½ cup of dry material to pour into a suitable receptacle placed below the aperture 36.

In a similar manner, if the operating lever 42 is moved to the ¾ cup position on the slot 43, the first, second, third and fourth compartments of the member 20 will be filled, and the contents of these compartments will pour through the dispensing aperture 36 at such time as the operating lever 42 has been returned to the reference location.

As should be obvious from the foregoing, when the operating lever 42 has been moved to the 1 cup position of the slot 43, all five of the compartments of the member 20 will be filled, with all of these compartments being emptied out through the dispensing aperture 36 at such time as the operating lever 42 has been moved back into the reference location.

With regard to the drawer 28 utilized in the embodiment of my invention incorporated into a canister, the outer portion of the drawer is of course of rounded construction so as to conform to the cylindrical configuration of the sidewall 14 constituting the outer portion of the housing member 12; see FIG. 3. As visible in FIG. 5, the drawer 28 is of a size so as to extend under a considerable portion of the lower part of the canister, with particular regard to the fact that the drawer extends entirely under the dispensing aperture 36. The drawer is supported by, and slidable upon, a flat lower wall (not shown) of the housing member 12. The drawer, the housing member 12, the rotatable member 20 as well as the other components are preferably made of a suitable plastic.

As shown in FIGS. 3 and 5, I may provide a suitable drawer pull 29 on the front of the drawer 28, thus greatly simplifying the effort of withdrawing the drawer when it contains a measured quantity of dry material, such that the contents of the drawer can then be poured into a mixing bowl or the like.

A single measuring and dispensing device can in accordance with this invention be utilized as a separate entity for successively dispensing various materials such as flour, sugar, certain grains and the like, in which case the lower portion of the housing 12 and the drawer 28 would be eliminated. It is my preference, however, that a separate dispensing device be used for each of the several items of dry material, or as stated differently, one dispensing device can be used for flour, another for sugar, and others of such devices in connection with the several grains that the user may wish to dispense. In this latter event, one of my novel measuring and dispensing devices can be utilized in each canister of a set of canisters, thereby entirely eliminating the use of the ordinary canisters commonly found in each kitchen.

I claim:

1. A canister device enabling loose dry material to be dispensed in selected quantities as substantially exact fractions of a cup, said device comprising a housing having upper, mid and lower sections, with said upper section having a refill opening for receiving dry material to be selectively dispensed, a multi-compartmented member operatively disposed in said mid section, said multi-compartmented member being rotatable in said mid section about a substantially vertically-disposed axis toward and away from a reference location, the compartments of said member being of a specific, uniform configuration and spaced symmetrically about the substantially vertical axis, said member being disposed between upper and lower generally planar partitions, an aperture of approximately the same configuration as the compartments of said rotatable member located in each of said partitions, but with one aperture located in an offset relationship with respect to the other, said upper partition being contiguous to said upper section in which dry material is contained, with such dry material dropping from said upper section of said housing under the influence of gravity through such aperture in the upper partition into one or more of the compartments of said member as such member is rotated about its axis away from said reference location, one or more of the compartments of said member being filled with dry material, with the number of compartments filled in a given instance being determined by the extent of rotation of said member away from said reference location, with the material in said compartments thereafter dropping downward through the aperture in said lower partition into receiving means during rotation of said member back to said reference location, to achieve a dispensing of dry material into said lower section as a selected fraction of a cup measurement, a portion of said lower section serving as a support for said receiving means as well as forming a support stand for said canister device.

2. The canister device for dispensing an exact, selected quantity of loose material as recited in claim 1 in which said member is movable into a plurality of distinct positions during the procedure in which the compartments of said member are being filled, in each of which successive positions, one of said compartments is in careful alignment with said aperture in said upper partition.

3. The cannister device for dispensing an exact, selected quantity of loose material as recited in claim 1 in which a lever is attached to said member, with the movement of said lever in one direction away from said reference location bringing about the filling of one or more of the compartments of said member, and the movement of said lever in the opposite direction bringing about the dispensing of the dry material from filled compartments, through the aperture in said lower partition.

4. The canister device for dispensing an exact, selected quantity of loose material as recited in claim 3 in which said lever is disposed to travel along an elongate slot during the procedure in which the compartments of said member are being filled, with markings provided at spaced locations along the length of said slot being indicative of quantity of material to be dispensed.

5. The canister device for dispensing an exact, selected quantity of loose material as recited in claim 1 in which each of the compartments of said member is generally triangularly shaped.

6. The canister device for dispensing an exact, selected quantity of loose material as recited in claim 1 in which stirring means are operatively disposed in said location where the dry material is contained.

7. The canister device for dispensing an exact, selected quantity of loose materials as recited in claim 1 in which said device forms an entity usable for measuring selected quantities of a number of different dry materials.

8. The canister device for dispensing a substantially exact, selected quantity of loose material as recited in claim 1 in which said receiving means is a drawer is provided in said lower section of said device, for receiving the dispensed dry material.

9. A cylindrically shaped canister device for receiving loose quantities of dry material, and for thereafter dispensing a selected quantity of such dry material as a substantially exact fraction of a cup, said device having an upper portion, a mid portion and a lower portion, with said upper portion having an opening for receiving the dry material to be dispensed, a compartment member located in said mid portion of said canister device, said member being rotatable about a central, generally vertical axis for a selected extent with respect to a reference location, each compartment of said member being principally made up of substantially vertically disposed sidewalls arrayed in a consistent, uniform configuration, and each compartment being symmetrically disposed about said central axis, a first partition located above said member, and a second partition located below said member, said first partition being in contact with said upper portion of said device, into which upper portion, dry material to be dispensed may be placed, an entrance aperture located in said first partition, said entrance aperture being of approximately the same configuration as each of said compartments of said member, and disposed in a position enabling any selected compartment to be brought into alignment therewith, depending upon the extent of rotation of said member away from said reference location, said member being rotatable away from said reference location to any of several distinct positions, so as to permit dry material located in said upper portion to drop, under the influence of gravity, through said entrance aperture into one or more of said compartments, with the number of compartments filled in a given instance being determined by the extent of rotation of said member away from said reference location, and a dispensing aperture located in said second partition, said dispensing aperture being rotationally offset from said entrance aperture and being larger than the width of two of the compartments of said member, the rotation of said member in the direction back to said reference location causing the dry material reposing in said compartments to successively drop through said dispensing aperture and into receiving means removably disposed in said lower portion of said canister device, and support mean operatively associated with said lower portion, for enabling said canister device to be supported in an operative, upright position on a horizontal surface.

10. The canister device for dispensing an exact, selected quantity of loose material as recited in claim 9 in which said member is movable into a plurality of distinct positions during the procedure in which the compartments of said member are being filled, in each of which successive positions, one of said compartments is in careful alignment with said entrance aperture.

11. The cannister device for dispensing an exact, selected quantity of loose material as recited in claim 9 in which a lever is attached to said member, with the movement of said lever in one direction away from said reference location bringing about the filling of the compartments of said member, and the movement of said lever in the opposite direction bringing about the dispensing of the dry material from filled compartments, through said dispensing aperture.

12. The canister device for dispensing an exact, selected quantity of loose material as recited in claim 11 in which said lever is disposed to travel along an elongate slot during the procedure in which the compartments of said member are being filled, with markings provided at spaced locations along the length of said slot being indicative of quantity of material to be released into the compartments of said member.

13. The canister device for dispensing an exact, selected quantity of loose material as recited in claim 9 in which each of the compartments of said member is generally triangularly shaped.

14. The canister device for dispensing a substantially exact, selected quantity of loose material as recited in claim 9 in which said receiving means is a drawer, said drawer is provided in said lower section of said device, for receiving the dispensed dry material.

15. A cylindrically shaped canister device for receiving loose quantities of dry material, and utilizing a rotatable, compartmented member as an integral portion of said device, with said compartmented member enabling the dispensing of a selected quantity of such dry material as a substantially exact fraction of a cup, said canister device having an upper portion presenting an opening for receiving the dry material to be dispensed, said canister device also having a mid portion and a lower portion, with said compartmented member being operatively disposed in said mid portion, said compartmented member being rotatable about a central, generally vertical axis for a selected extent with respect to a reference location, with each compartment of said compartmented member being principally made up of substantially vertically disposed sidewalls arrayed in a consistent, uniform configuration, and each compartment being symmetrically disposed about said central axis, a first partition located above said member, and a second partition located below said member, said first partition being in contact with said upper portion of said device, into which upper portion, dry material to be dispensed is to be placed, an entrance aperture located in said first partition, said entrance aperture being of approximately the same configuration as each of said compartments of said member, and disposed in a position enabling any selected compartment to be brought into alignment therewith, depending upon the extent of rotation of said member away from said reference location, said member being rotatable away from said reference location to any of several distinct positions, so as to permit dry material located in said upper portion to drop, under the influence of gravity, through said entrance aperture into one or more of said compartments, with the number of compartments filled in a given instance being determined by the extent of rotation of said member away from said reference location, and a dispensing aperture located in said second partition, said dispensing aperture being rotationally offset from said entrance aperture and being larger than the width of two of the compartments of said member, the rotation of said member in the direction back to said reference location causing the dry material reposing in said compartments to successively drop through said dispensing aperture and into receiving means removably disposed in said lower portion of said canister device, and support means operatively associated with said lower portion, for enabling said canister device to be Supported in an operative, upright position on a horizontal surface.

16. The cylindrically shaped canister device as recited in claim 15 in which a lever is attached to said member, with the movement of said lever in one direction away from said reference location bringing about the filling of one or more of the compartments of said member, and the movement of said lever in the opposite direction bringing about the dispensing of the dry material from filled compartments, through the aperture in said second partition.

17. The cylindrically shaped canister device as recited in claim 16 in which said lever is disposed to travel along an elongate slot during the procedure in which the compartments of said member are being filled, with markings provided at spaced locations along the length of said slot being indicative of quantity of material to be dispensed.

18. The cylindrically shaped canister device as recited in claim 16 in which each of the compartments of said member is generally triangularly shaped.

19. The cylindrically shaped canister device as recited in claim 16 in which stirring means are operatively disposed in said location where the dry material is contained.

* * * * *